(12) United States Patent
Lee et al.

(10) Patent No.: US 7,731,137 B2
(45) Date of Patent: Jun. 8, 2010

(54) VERTICALLY ADJUSTABLE SUPPORTING STRUCTURE

(75) Inventors: Yung-Ta Lee, Sinjhuang (TW); Chia-Han Lin, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 253 days.

(21) Appl. No.: 11/896,928

(22) Filed: Sep. 6, 2007

(65) Prior Publication Data

US 2008/0277555 A1 Nov. 13, 2008

(30) Foreign Application Priority Data

May 11, 2007 (TW) .............................. 96116756 A

(51) Int. Cl.
*F16M 11/00* (2006.01)
(52) U.S. Cl. ................. 248/157; 248/276.1; 248/284.1; 248/917; 361/679.02
(58) Field of Classification Search ................. 248/157, 248/371, 284.1, 917, 919, 920, 921, 922; 108/147; 16/366; 361/679.22
See application file for complete search history.

(56) References Cited

U.S. PATENT DOCUMENTS 3,820,752 A * 6/1974 Oram ....................... 248/284.1
5,311,827 A * 5/1994 Greene ........................ 108/147
5,538,214 A * 7/1996 Sinila ....................... 248/278.1
6,378,829 B1 * 4/2002 Strater et al. ............. 248/276.1
6,822,857 B2 11/2004 Jung et al.
7,404,233 B2 * 7/2008 Lu et al. ....................... 16/302

* cited by examiner

*Primary Examiner*—Anita M King
(74) *Attorney, Agent, or Firm*—Guice Patents PLLC

(57) ABSTRACT

A vertically adjustable supporting structure that comprises a link member whose bottom and top portions disposed with a lower end and a top end; a lower hinge having at least one shaft pivoted on the lower end of the link member so as to render the link member rotatably pivoted between the two lower frames of the lower hinge; an upper hinge having at least one shaft pivotally connected on the upper end of the link member so as to render the link member rotatably pivoted between the two upper frames of the upper hinge; at least a coupling assembly having one lower axle wheel and one upper axle wheel disposed between the lower end and the upper end of one side of the link member and between the lower frame and upper frame, respectively, and pivoted on the lower hinge and upper hinge, respectively, with a flexible cord engagingly secured between the lower and upper axle wheels; and at least an idle wheel pivoted on one side of the link member and between the lower and upper axle wheels to be interlacing engaged with the flexible cord and to form a coupling movement, such that the coupling assembly transforms the circular movement of the link member into a rotation for compensating displacement difference of two upper frames without affecting their original angle.

13 Claims, 8 Drawing Sheets

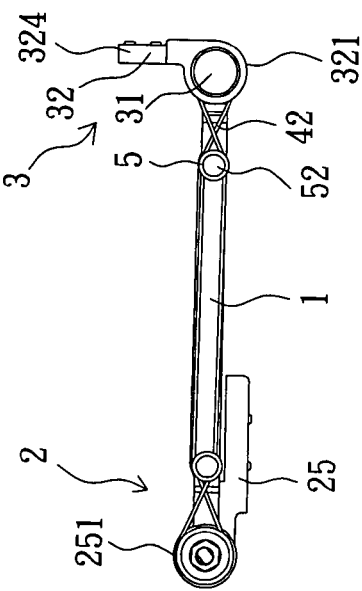
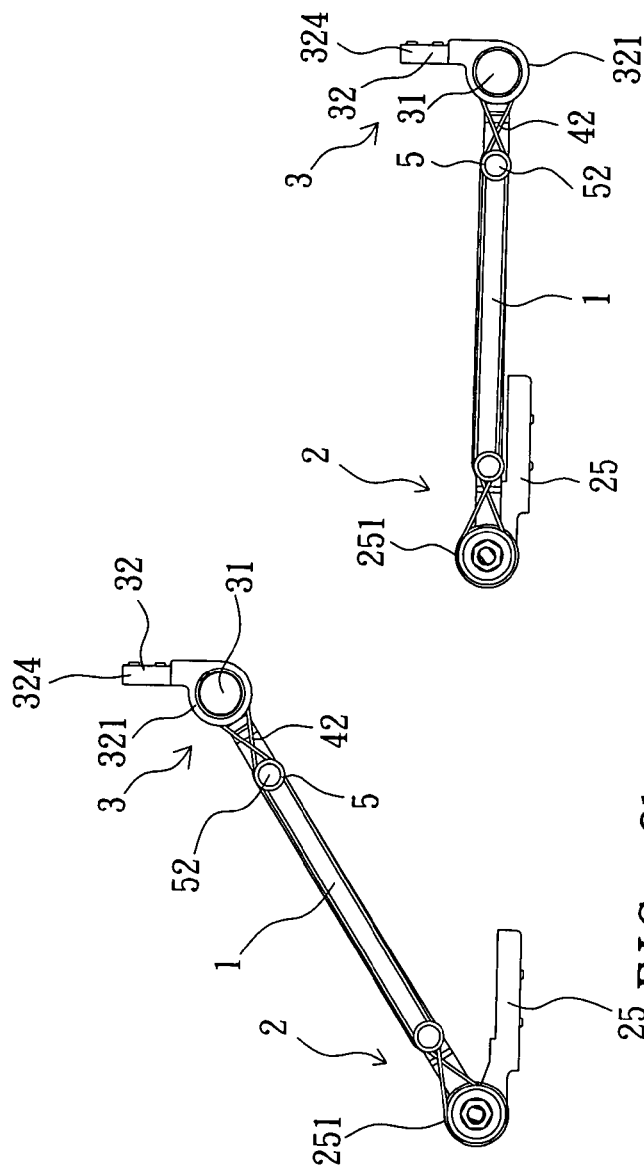
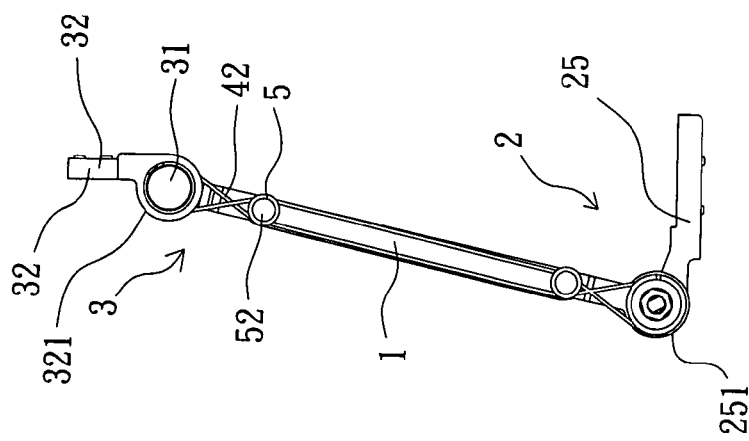
FIG. 8c
FIG. 8b
FIG. 8a

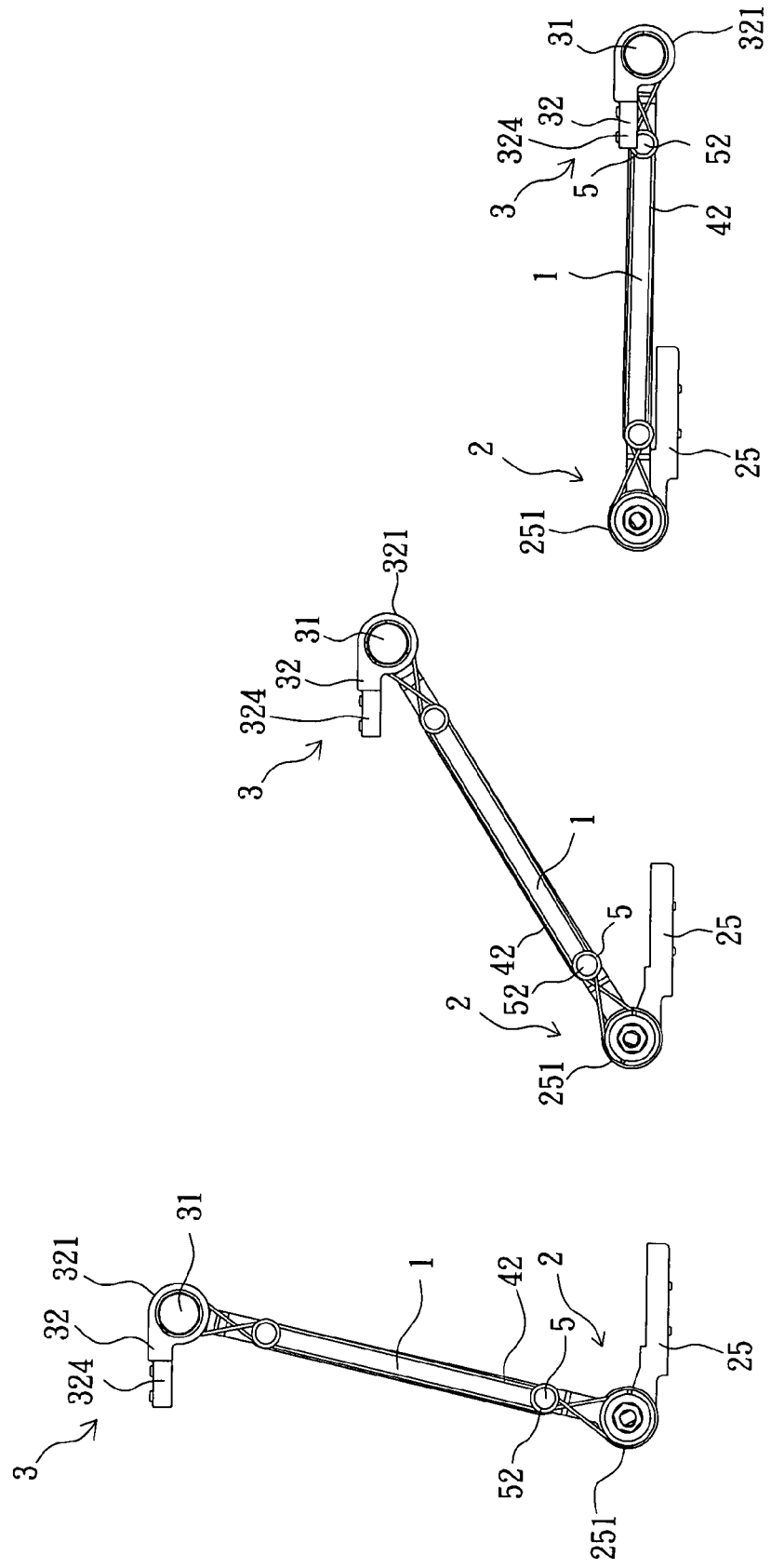

VERTICALLY ADJUSTABLE SUPPORTING STRUCTURE

FIELD OF THE INVENTION

The present invention relates to a vertically adjustable supporting structure, and more particularly to a vertically adjustable supporting structure that comprises a link member with its bottom portion and top portion connected with a lower hinge and an upper hinge, respectively, between which is connected with a coupling assembly such that when the upper hinge is adjusted along vertical as well as longitudinal directions, the supporting structure can be adjusted without affecting the original angle of the supported object.

BACKGROUND OF THE INVENTION

Flat panel displays, such as liquid crystal display (LCD) monitor, LCD TV, or plasma TV, have the advantages of lightweight, thinness, and radiation-free and thus has gradually replaced conventional cathode ray tube (CRT) monitors. Since the LCD or plasma monitor is limited by its visual angle, there is a hinge structure between the monitor and its base such that the angle of elevation of the monitor can be adjusted with respect to the base, However, this kind of mechanism cannot provide a flat panel display with functions of moving along vertical as well as longitudinal direction. Consequently, the relevant industry has developed a parallel-arranged auxiliary link member to overcome the shortcoming; for example, the ends of two connecting rods are respectively connected to a main hinge and a base hinge disposed on the upper and lower ends of a link member. In the China Patent No CN 1,244,852C, Monitor Improved in a Tilting Structure, authorized on Mar. 8, 2006, corresponding to the U.S. Pat. No. 6,822,857, the parts numbered as 100 and 110, shown in FIG. 5 of the patent, is a pair of parallel-arranged auxiliary link member. In the patent, the pair of auxiliary link members provided on the respective side of the link member, the main hinge, and the base hinge form a four bar linkage mechanism. Consequently, the auxiliary link member transforms the rotating movement of the link member into the tilting movement of a monitor. In other words, when the height of the monitor main body is to be adjusted, the link member is moved upward and downward to tilt the main body of the monitor, only a second and third friction springs (sleeve) connected to the main frame rotate with respect to a third and fourth hinge pin, such that the main body of the monitor maintain its original angle during the movement.

Moreover, the conventional four bar linkage mechanism is installed on one side of the link member and the pair of parallel-arranged auxiliary link member is arranged one on top of the other, leading to a thick link member. On the other hand, it is necessary to wrap around the auxiliary link member, the thickness of the packaging case is thus increased greatly and therefore the supporting structure appears bulky and offensive to the esthetic sensibilities. Further, the four bar linkage mechanism employed for monitors has a critical influence over the entire industry. Consequently, the relevant industries are eager to develop another linking mechanism to replace the four bar linkage mechanism currently dominated the market of the supporting structure of monitors according to the design around principle.

SUMMARY OF THE INVENTION

In view of the foregoing shortcomings of the prior art, the inventor of the present invention based on years of experience in the related industry to conduct extensive researches and experiments, and finally invented a Vertically Adjustable Supporting Structure in accordance with the present invention.

The primary objective of the present invention is to provide a vertically adjustable supporting structure that comprises a link member whose bottom and top portions disposed with a lower end and a top end; a lower hinge having at least one shaft pivoted on the lower end of the link member so as to render the link member rotatably pivoted between the two lower frames of the lower hinge; an upper hinge having at least one shaft pivotally connected on the upper end of the link member so as to render the link member rotatably pivoted between the two upper frames of the upper hinge; at least a coupling assembly having one lower axle wheel and one upper axle wheel disposed between the lower end and the upper end of one side of the link member and between the lower frame and upper frame, respectively, and pivoted on the lower hinge and upper hinge, respectively, with a flexible cord engagingly secured between the lower and upper axle wheels; and at least an idle wheel pivoted on one side of the link member and between the lower and upper axle wheels to be interlacing engaged with the flexible cord and to form a coupling movement, such that the coupling assembly transforms the circular movement of the link member into a rotation for compensating displacement difference of two upper frames without affecting their original angle.

Another objective of the present invention is to provide a vertically adjustable supporting structure, wherein the upper and lower ends of the link member extend protrudingly to form a pair of upper lugs and a pair of lower lugs, respectively, through each of which a through hole is formed for the pivotal connection of the upper and lower hinges.

A further objective of the present invention is to provide a vertically adjustable supporting structure, wherein the lower hinge is rotatably disposed into two rotating bases on the pair of lower lug of the lower end of the link member, respectively, by insertingly fitting a respective fixed shaft with, in order of, an axial hole of the lower lug, a first washer, a second washer, a support ring of the lower frame, at least a flexible part, and finally an end cap connected with the fixed shaft.

Another further objective of the present invention is to provide a vertically adjustable supporting structure, wherein between the lower lug and the first washer is disposed with a frictional disc, whose circumference extends inwards to form a fastening tenon, which is fastened and positioned onto a fastening slot formed on the circumference of the axial hole of the lower lug.

A further objective of the present invention is to provide a vertically adjustable supporting structure, wherein the fixed shaft is a single part sheathingly inserted into a torsional spring between the two lower lugs and extends its two ends, respectively, to abut against a notch groove formed inward on the lower end of the link member and an accommodating groove.

Another further objective of the present invention is to provide a vertically adjustable supporting structure, wherein the second washer is securingly fastened on the inner side of the frame ring with at least an engaging tenon engagingly fitted into a corresponding connection hole formed on the frame ring for fastening.

A further objective of the present invention is to provide a vertically adjustable supporting structure, wherein the upper hinge is rotatably disposed into two rotating bases on the pair of the upper lugs on the upper end of the link member by insertingly fitting a respective movable shaft with, in order of, a seat ring of the upper frame, a third washer, a fourth washer, an axial hole of the upper lug, a fifth washer, at least a flexible part, and finally an end cap connected with the movable shaft.

Another further objective of the present invention is to provide a vertically adjustable supporting structure, wherein between the seat ring of the upper frame and the third washer is disposed with a frictional disc, whose circumference extends outward to forms a fastening tenon engagingly fastened and positioned onto the fastening slot formed on the circumference of the seat ring, and also between the upper lug and the fourth washer as well as between the five washer is disposed with a frictional disc, respectively, whose circumference extends inward to forms a fastening tenon engagingly fastened and positioned onto the fastening slot formed on the circumference of the axle shaft of the upper lug.

A further objective of the present invention is to provide a vertically adjustable supporting structure, wherein an arc-shape angle restricting groove is formed on inner side of the seat ring of the upper frames to continuously accommodate an engaging tenon protrudingly formed on the circumference of the third washer.

Another further objective of the present invention is to provide a vertically adjustable supporting structure, wherein a retaining device provided on the upper hinge, is formed by insertingly fitting, in an order of, a retaining ring and an engaging ring securingly disposed inside the seat ring between the movable shaft and the upper frames; the retaining ring is oppositely disposed with two protruding ring tenons on its inner surface and the circumference of the engaging ring is formed to have two oppositely indented, arc-shape engaging slots, such that when the two upper frames rotates along with the top rack, the ring tenons of the retaining ring runs across the stop edge of one engaging slot and engages onto the other engaging slot to render the upper frames parallel to the top lower frames.

A further objective of the present invention is to provide a vertically adjustable supporting structure, wherein, the flexible cord comprises two connection cords with a positioning block on both ends, respectively; two pin holes formed at both sides of the central wheel groove of the two axle wheels, respectively, are separated at a predetermined distance and correspond to each other, such that the respective pin holes of the lower and upper axle wheels are engagingly fitted by the positioning blocks on the both ends of the connection cords for positioning.

Another further objective of the present invention is to provide a vertically adjustable supporting structure, wherein a cord groove is formed at the center of the idle wheel to be interlacingly engaged with the flexible cord.

BRIEF DESCRIPTION OF THE DRAWINGS

FIGS. 8*a* to 8*c* are an illustration of a supporting structure of the present invention being adjusted in vertical direction; and FIGS. 9*a* to 9*c* are an illustration of a supporting structure of the present invention being folded inward.

DETAILED DESCRIPTION OF THE PREFERRED EMBODIMENTS

Figure 1:
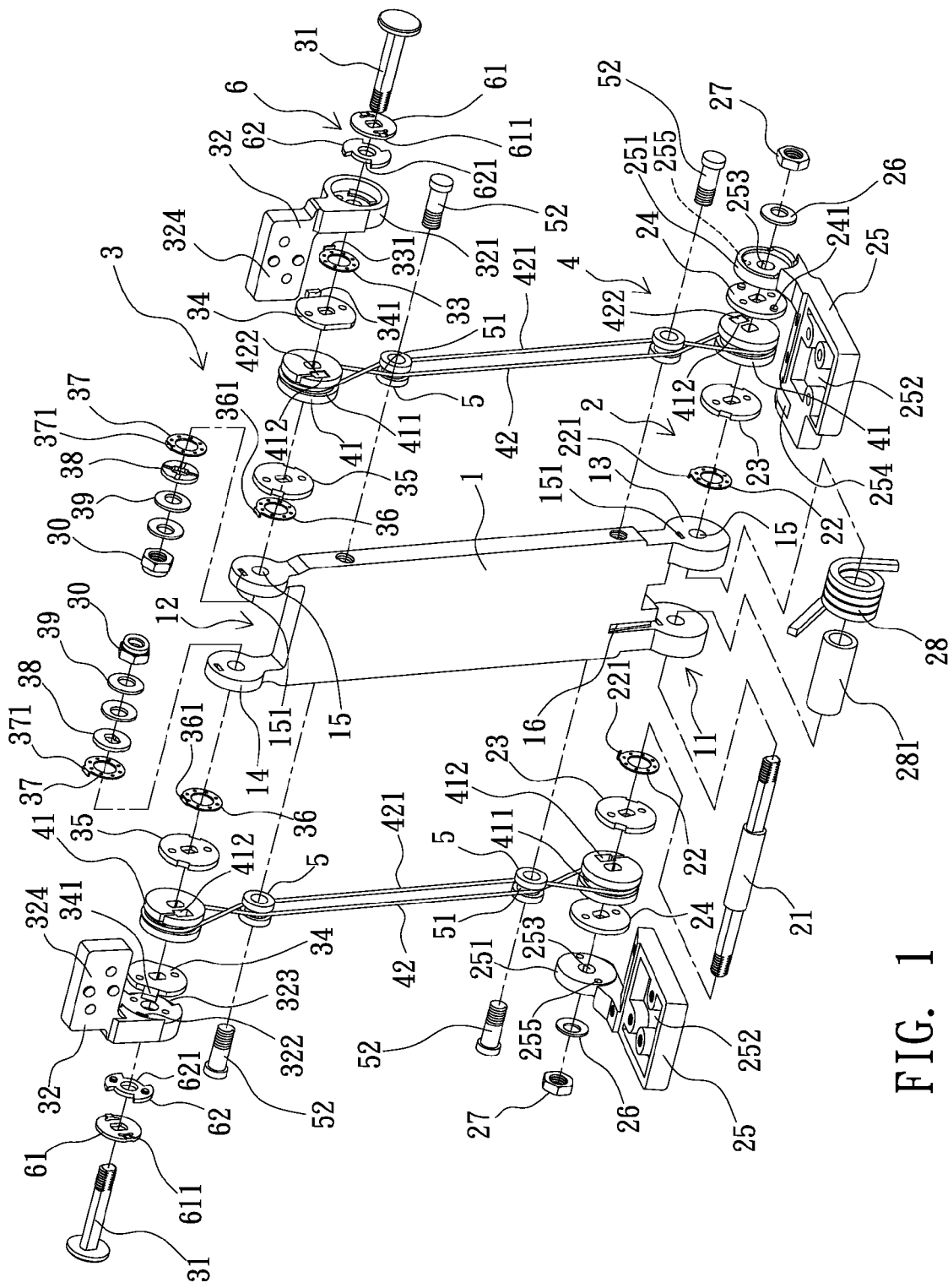
FIG. 1 is an exploded view of a supporting structure of the present invention.

The structure, technical measures and effects of the present invention will now be described in more detail hereinafter with reference to the accompanying drawings that show various embodiments of the invention.

Referring to FIGS. 1 to 7, the supporting structure according to the present invention comprises a link member 1, a lower hinge 2, an upper hinge 3, at least a coupling assembly 4, and at least an idle wheel 5.

The link member 1 is a square plate with a lower end 11 and an upper end 12 upon which the lower hinge 2 and the upper hinge 3 may be pivotally connected to form a rotatable connection. As shown in the figures, the lower and upper ends 11, 12 extends protrudingly to form a pair of lower lugs 13 and a pair of upper lugs 14, respectively, through which an axial hole 15 is formed, respectively.

Figure 5:
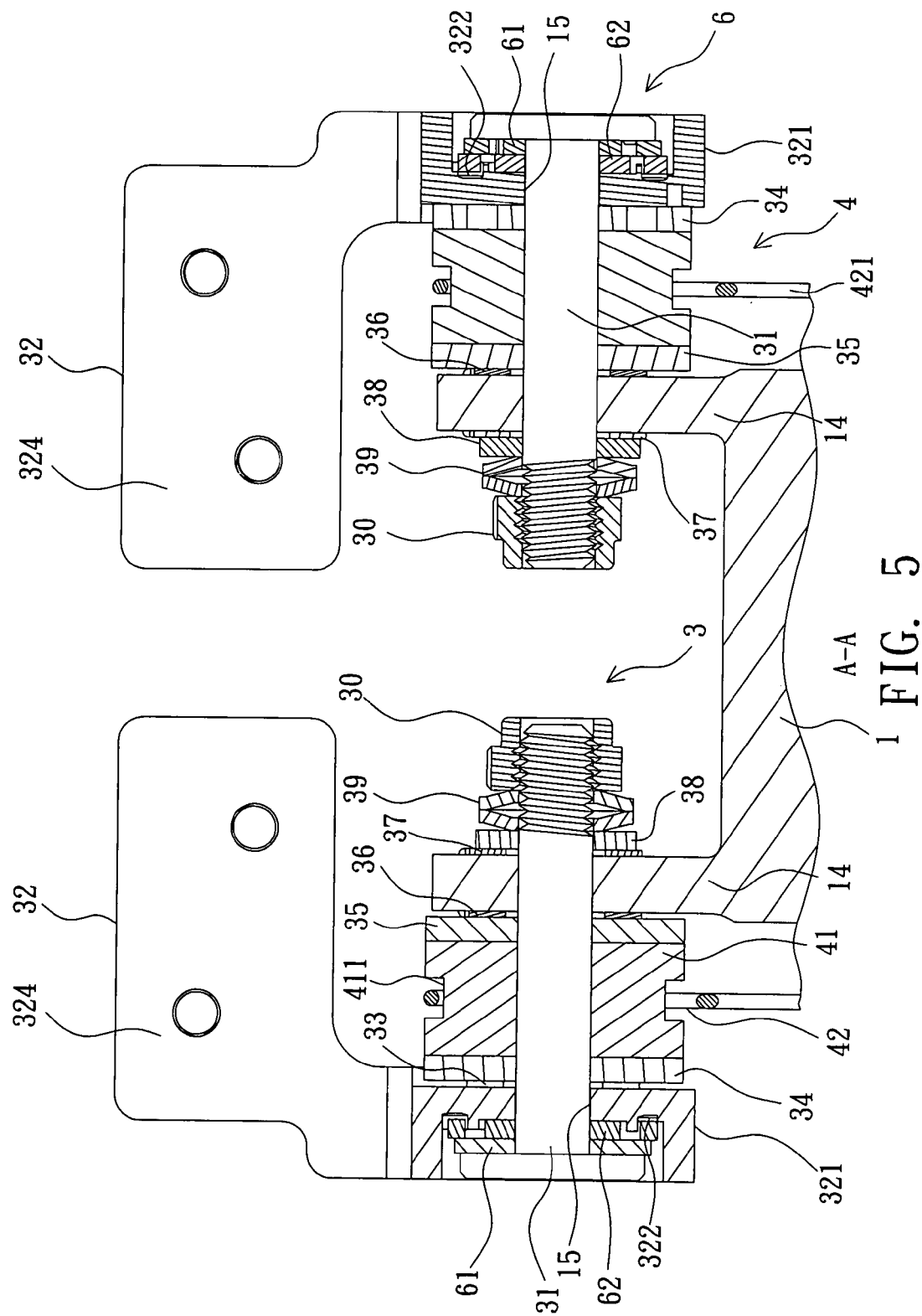
FIG. 5 is a cross-sectional view of an upper hinge from Section A-A as depicted in FIG. 4 of the present invention.
Figure 6:
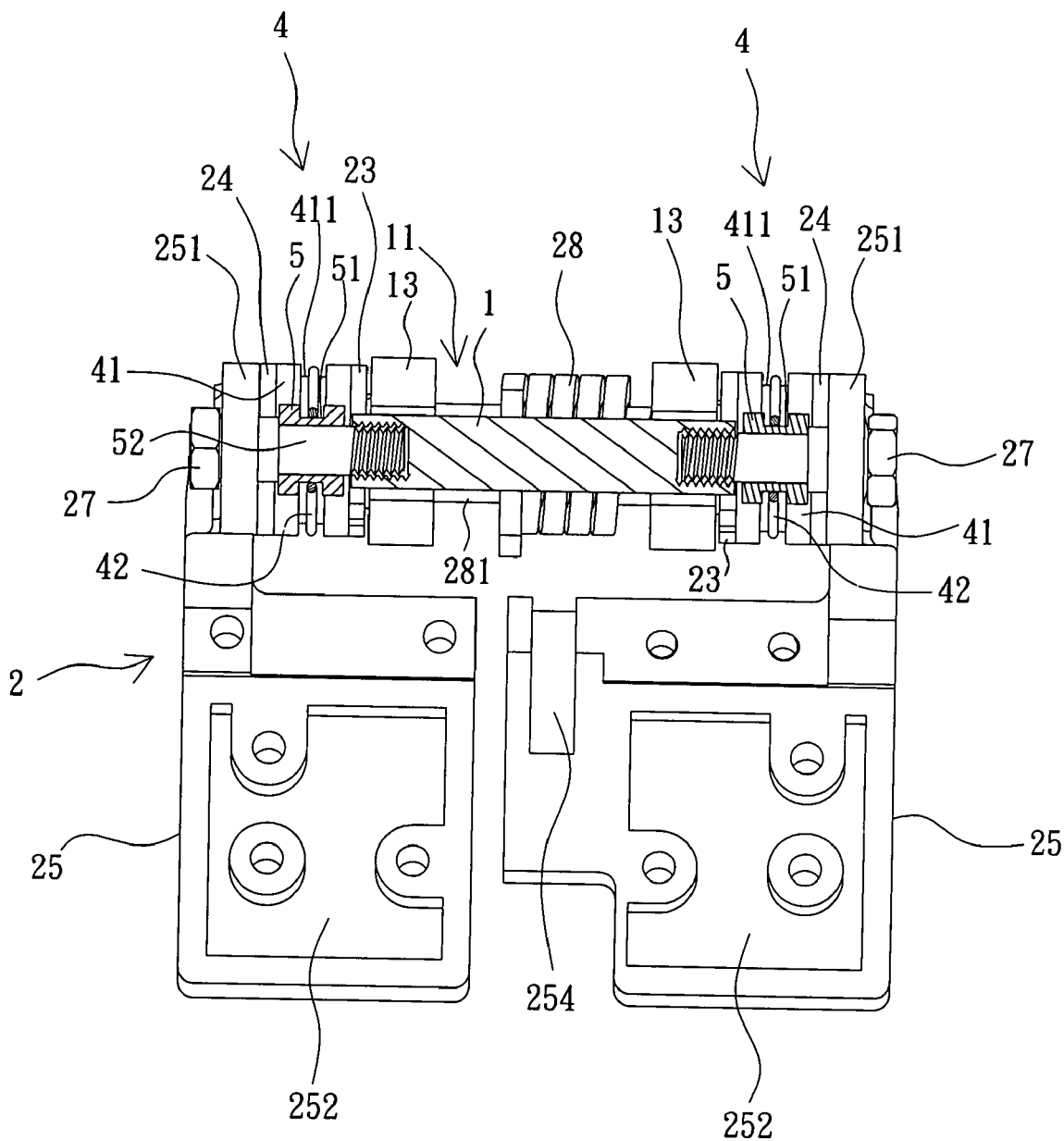
FIG. 6 is a cross-sectional view of an idle wheel from Section B-B as depicted in FIG. 4 of the present invention.

With reference to FIGS. 1 and 5, the lower hinge 2 is rotatably disposed into two rotating bases on the pair of lower lug 13 of the lower end 11 of the link member 1, respectively, by insertingly fitting a respective fixed shaft 21 with, in order of, an axial hole 15 of the lower lug 13, a frictional disc 22, a first washer 23, a second washer 24, a frame hole 253 of a frame ring 251 of a lower frame 25, at least a flexible part 26, and finally an end cap 27, a self-locking nut for example, which is connected with the fixed shaft 21 to press against the aforementioned elements, such that the link member 1 may rotate as well as arrest and position with respect to the two lower frames 25. The circumference of the frictional disc 22 extends inwards to form a fastening tenon 221, which is fastened and positioned onto a fastening slot 151 formed on the circumference of the axial hole 15 of the lower lug 13.

With reference to FIG. 1, the fixed shaft 21 is a single part sheathingly inserted into a torsional spring 28 between the two lower lugs 13 and extends its two ends, respectively, to abut against a notch groove 16 formed inward on the lower end 11 of the link member 1 and an accommodating groove 254 predeterminedly formed on the surface of the connection portion 252 of the lower frame 25, respectively, such that when the link member 1 swings downward to press against the torsional spring 28 and in turn tightly squeezes a sleeve 281 run through by the fixed shaft 21. Also, the advantage of disposing the two lower frames 25 lies in the fact that conventional fastening parts, screws for example, may be used to insert through the parallel-arranged connection portion 252 to secure the lower frame 25 onto a base (conventional art, not shown). The base may be tailor made to meet customers' demand in terms of shape or specification such that the inventory of the base may be cut down. Further, the fixed shaft 21 may also be two symmetrically disposed parts, not limited to a single part as described previously.

Since the fixed shaft 21 and the frame ring 251 of the lower frame are in a fastening state, the friction (and thus frictional force) occurs between the lower lug 13, frictional disc 22, and the first washer 23 such that the link member 1 may swing about the two lower frames 25 with the fixed shaft 21 as a pivot. Further, the second washer 24 is securingly fastened on the inner side of the frame ring 251 with, for example, at least an engaging tenon 241 engagingly fitted into a corresponding connection hole 255 formed on the frame ring 251, such that the second washer 24 securingly fastened on the inner side of the respective lower frame 25.

Figure 7:
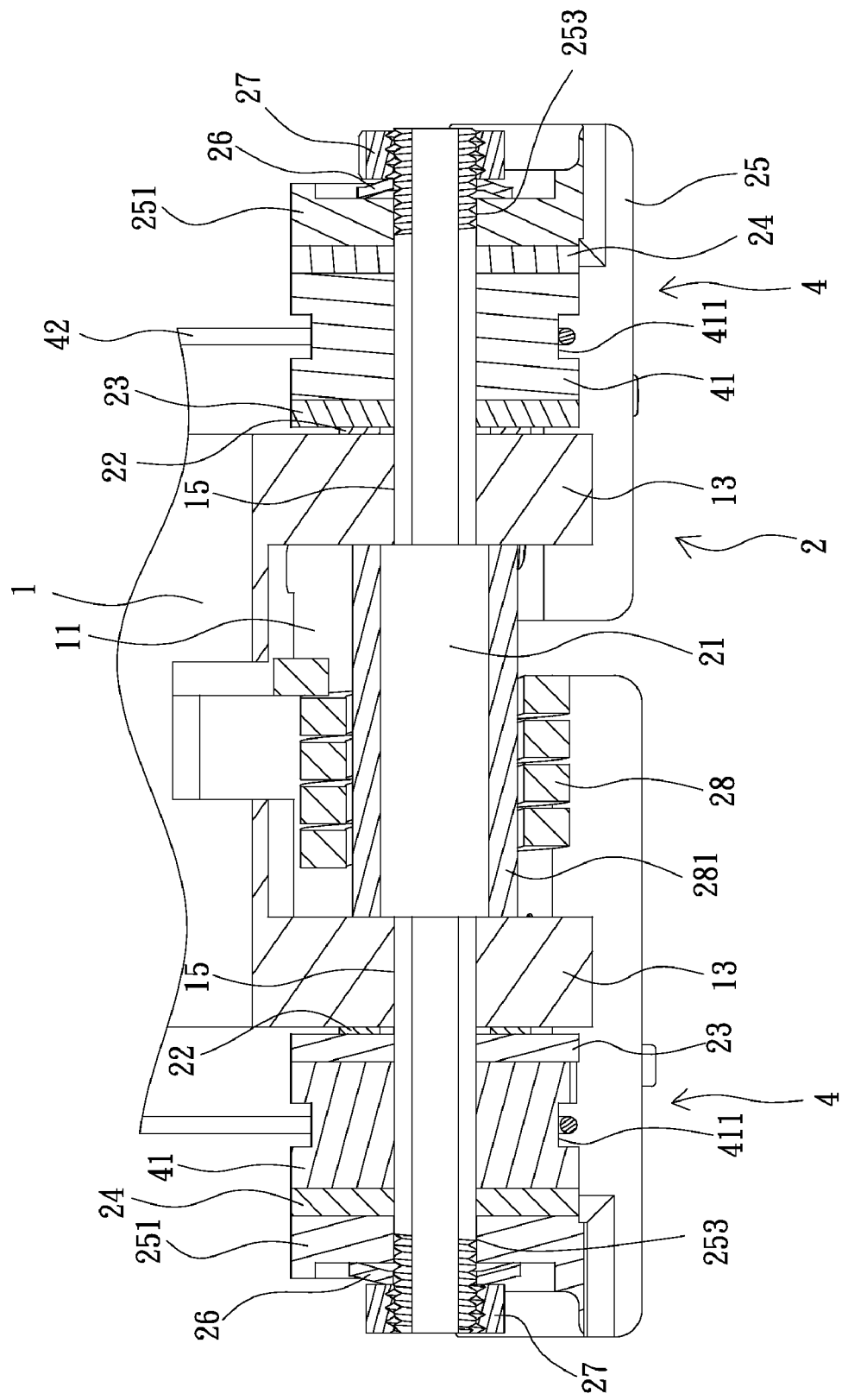
FIG. 7 is a cross-sectional view of a lower hinge from Section C-C as depicted in FIG. 4 of the present invention.

With reference to FIGS. 1 and 7, the upper hinge 3 is rotatably disposed into two rotating bases on the pair of the upper lugs 14 on the upper end 12 of the link member 1 by insertingly fitting a respective movable shaft 31 with, in order of, a seat ring 321 of the upper frame 32, a frictional disc 33, a third washer 34, a fourth washer 35, a frictional disc 36, an axial hole 15 of the upper lug 14, a frictional disc 37, a fifth washer 38, at least a flexible part 39, and finally an end cap 30, a self-locking nut for example, which is connected with the movable shaft 31 to press against the aforementioned elements, such that the upper frames 32 may rotate as well as arrest and position with respect to the link member 1, wherein the flexible parts 26 and 39 may be disc springs, wave springs or springs when implemented.

In fact, the circumference of the frictional disc 33 protrudes to form a fastening tenon 331, which is engagingly fastened and positioned onto the fastening slot 322 formed on the circumference of the seat ring 321. The circumferences of the other two frictional discs 36, 37 protrude inward to form a fastening tenon 361 and 371, respectively, such that they may be engaged and positioned onto the fastening slot 151 formed on the circumference of the axial hole 15 of the upper lug 14. Also, an arc-shape angle restricting groove 323 is formed on inner side of the seat ring 321 of the upper frames 32 to continuously accommodate an engaging tenon 341 protrudingly formed on the circumference of the third washer 34 so as to limit the adjustment of the angle of elevation of the upper frame 32. Further, the link portion 324 of the upper frame 32 is connected to a supported object, a flat panel display for example, by a conventional fastening part, a screw for example, which is inserted through and fastened onto a top rack (conventional art, not shown). The supported object, by its weight, is pressed against the lower edge of the angle restricting groove 323 and rotates downward slightly. Consequently, frictional force generated by the upper frame 32, the frictional disc 33, and the third washer 34 as well as the fourth washer 35, the frictional disc 36, the fifth washer 38, and the frictional disc 37 may render the top rack together with the supported object capable of being adjusted for the angle of elevation. The advantage of disposing two upper frames 32 lies in the fact that they are connected with the top rack and the top rack may be tailor made to meet customers' demand in terms of shape or specification such that the inventory of the top rack may be cut down.

Further, a retaining device 6 may be provided inside the seat ring 321 of the upper frame 32, wherein the movable shaft 31 is insertingly secured into, in order of, a retaining ring 61 and an engaging ring 62 securingly disposed inside the seat ring 321, wherein the retaining ring 61 is oppositely disposed with two protruding ring tenons 611 on its inner surface and the circumference of the engaging ring 62 is formed to have two oppositely indented, arc-shape engaging slots 621. When the two upper frames 32 rotates along with the top rack, the ring tenons 611 of the retaining ring 61 runs across the stop edge of one engaging slot 621 and engages onto the other engaging slot 621, such that the top rack is parallel to the base.

Figure 2:
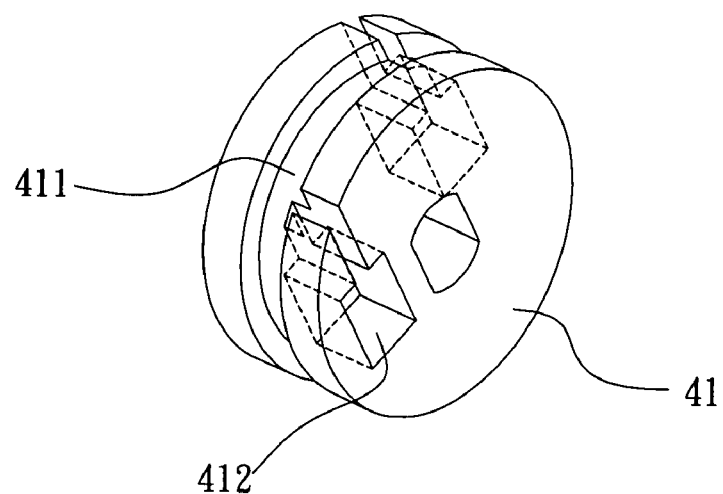
FIG. 2 is a perspective view of an axle wheel of the present invention.
Figure 3:
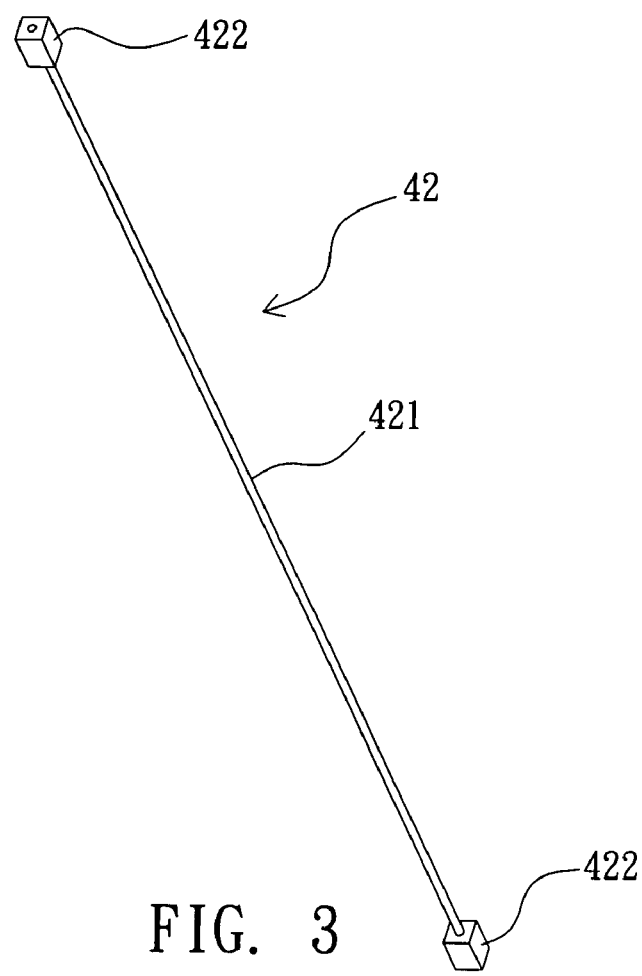
FIG. 3 is a perspective view of a connection cord of the present invention.
Figure 4:
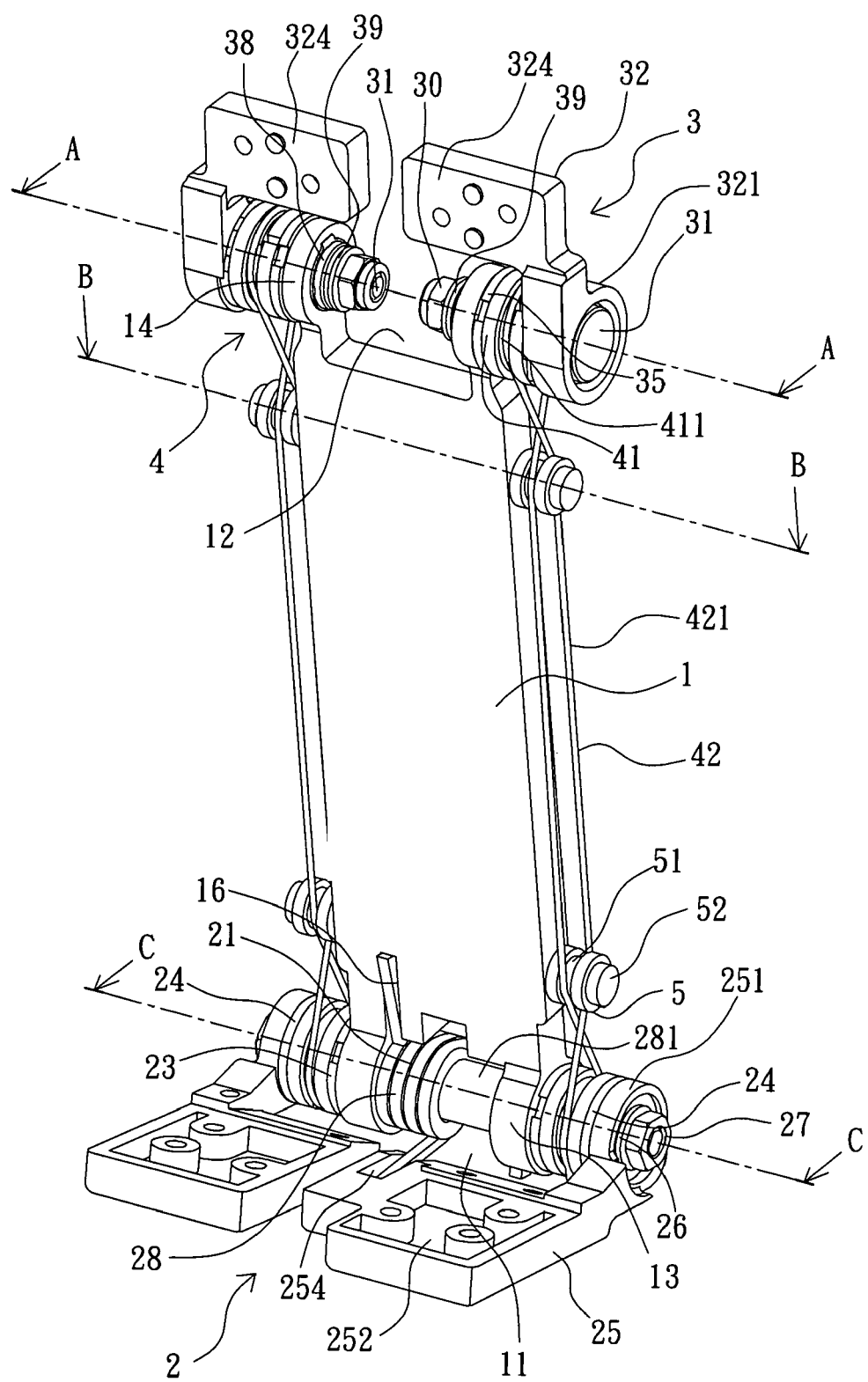
FIG. 4 is a perspective assembly view of the present invention.

With reference to FIGS. 1 to 3, coupling assembly 4 is formed by connecting two axle wheels 41 onto the exterior of the link member 1 and they are pivotally connected with the fixed shaft 21 of the lower hinge 2 and the movable shaft 31 of the upper hinge 3, respectively. To render the fixed shaft 21 and the lower and upper axle wheels 41 sheathingly inserted on the movable shaft 31 forming a four bar linkage mechanism, and thus transforming a circular movement to linear movement, a flexible cord 42 is engagingly secured between two central wheel grooves 411, as shown in the figures. The flexible cord 42 comprises two connection cords 421 with a positioning block 422 on the respective end. Two pin holes 412 formed at both sides of the central wheel groove 411 of the respective axle wheel 41, respectively, are separated at a predetermined distance and correspond to each other. The respective pin holes 412 of the lower and upper axle wheels 41 are engagingly fitted by the positioning block 422 on the both sides of the connection cord 421, such that the coupling assembly 4 forms a four bar linkage mechanism.

At least one idle wheel 5 is provided in the present invention. An axle pin 52 runs through two idle wheels 5, shown in the figures, and is securingly fastened on the side of the link member 1 such that the idle wheels 5 are located between the upper and lower axle wheels 41 and render the flexible cord 42, the two connection cords 421 for example, interlacingly engaged onto the center of the cord groove 51 so as to tighten the connection cord 421. In fact, the aim of disposing the idle wheel 5 is that since its outer diameter may be smaller than the lower and upper axle wheels 41, it is not necessary to dispose a pair of parallel-arranged auxiliary link members on the side of the link member 1 and thus its thickness can be greatly reduced. Further, after the link member 1 is connected with its packaging case, the total thickness will not be large and bulky, thereby achieve esthetic sensibilities. In the mean time, the thickness of the link member 1 is greatly reduced by disposing the idle wheel 5 and thus the manufacturing cost can be cut down.

With reference to FIGS. 8a to 8c, if the supported object is to adjusted, the height of the flat panel display for example, the adjustment amounts to rotate the link member 1 upward or downward in a circular movement about the lower hinge 2 as its pivotal axle. Since there is at least one coupling assembly 4, which is equivalent to a four bar linkage mechanism, the link member 1 will not turn the two connection cords 421 of the flexible cord 42. Consequently, when the link member 1 rotates to form an displacement difference, the flexible cord 42 will be induced to produce a rotating angle misalignment with respect to the link member 1, such that the axle wheel 41 which is engaged with the flexible cord 42 with not rotate and, on the other hand, the axle wheel 41, the two movable shafts 31, and the two upper frames 32 rotate to compensate the displacement difference with respect to the upper lug 14 of the link member 1, thereby achieving the change of vertical elevation and longitudinal displacement without affecting the original angle of the two upper frames 32; in other words, the upper frames 32 will rotate with the link member 1, maintaining their original angle.

With reference to FIG. 9a, the two upper frames 32 are parallel to the two lower frames 25. If an external force is applied, the link member 1 will descend and form a state as shown in FIG. 9b. At this moment, the two upper frames 32 can now be adjusted to the state shown in FIG. 9c, thereby greatly reducing the distance between the two upper frames 32 and the two lower frames 25. Consequently, the volume of the product can be reduced, and thus packaging is convenient and transportation cost can be cut down.

With the implementation of the present invention, the coupling assembly is secured with its dimension, one end securingly fastened on the lower hinge and the other end pivotally connected with the upper hinge. When the adjustment of vertical height and longitudinal displacement is needed, the rotation radius of the coupling assembly becomes the displacement range of the coupling assembly, such that the coupling assembly will function as a four bar linkage mechanism and will not affect the original height of the two upper frames. Further, the idle wheel, pivotally connected on the side of the link member, is to be engagingly secured by the flexible cord so as to tighten the cord and also render the link member thinner. Moreover, between the movable shaft and the upper frame is insertingly secured with, in order of, a retaining ring and an engaging ring securingly disposed inside the seat ring of the upper frame. When the two upper frames rotate anticlockwise, the pair of the engaging slots are engaged and positioned onto the ring tenons of the retaining ring, rendering the two upper frames parallel to the two lower frames. If an external force is applied, the link member will descend to greatly reduce the distance between the two upper frames and the two lower frames. Consequently, the volume of the entire product can be reduced, and thus packaging is convenient and transportation cost can be reduced. The present invention is definitely a novel breakthrough of the adjustable supporting structure.

The present invention provides a feasible solution, and a patent application is duly filed accordingly. However, it is to be noted that the preferred embodiments disclosed in the specification and the accompanying drawings are not intended to limit the invention. To the contrary, it is intended to cover various modifications and similar arrangements and procedures, and thus the scope of the appended claims should be accorded the broadest interpretation so as to encompass all such modifications and similar arrangements and procedures.

What is claimed is:

1. A vertically adjustable supporting structure comprising:
   a link member whose bottom and top portions are disposed with a lower end and a top end;
   a lower hinge having a respective fixed shaft pivoted on the lower end of the link member so as to render the link member rotatably pivoted between two lower frames of the lower hinge;
   an upper hinge having at least one respective movable shaft pivotally connected on the upper end of the link member so as to render the link member rotatably pivoted between two upper frames of the upper hinge;
   at least a coupling assembly having one lower axle wheel and one upper axle wheel disposed between the lower end and the upper end of one side of the link member and between the lower frame and the upper frame, respectively, and pivoted on the lower hinge and upper hinge, respectively, with a flexible cord engagingly secured between the lower and upper axle wheels; and
   at least an idle wheel pivoted on one side of the link member and between the lower and upper axle wheels to be interlacingly engaged with the flexible cord and to form a coupling movement, such that the coupling assembly transforms a circular movement of the link member into a rotation for compensating displacement difference of the two upper frames without affecting their original angle.

2. The vertically adjustable supporting structure as claimed in claim 1, wherein the top and lower ends of the link member extend protrudingly to form a pair of upper lugs and a pair of lower lugs, respectively, through each of which an axial hole is formed for the pivotal connection of the upper and lower hinges.

3. The vertically adjustable supporting structure as claimed in claim 2, wherein the lower hinge is rotatably disposed into two rotating bases on the pair of lower lug of the lower end of the link member, respectively, by insertingly fitting the respective fixed shaft with, in order of, the axial hole of the lower lug, a first washer, a second washer, a support ring of the lower frame, at least a flexible part, and finally an end cap connected with the fixed shaft.

4. The vertically adjustable supporting structure as claimed in claim 3, wherein between the lower lug and the first washer is disposed a frictional disc, whose circumference extends inwardly to form a fastening tenon, which is fastened and positioned onto a fastening slot formed on the circumference of the axial hole of the lower lug.

5. The vertically adjustable supporting structure as claimed in claim 3, wherein the fixed shaft is a single part sheathingly inserted into a torsional spring between the two lower lugs and two ends of the torsional spring extend, respectively, to abut against a notch groove formed on the lower end of the link member and an accommodating groove.

6. The vertically adjustable supporting structure as claimed in claim 3, wherein the second washer is securingly fastened on an inner side of a frame ring with at least an engaging tenon engagingly fitted into a corresponding connection hole formed on the frame ring for fastening.

7. The vertically adjustable supporting structure as claimed in claim 2, wherein the upper hinge is rotatably disposed into two rotating bases on the pair of the upper lugs on the upper end of the link member by insertingly fitting the at least one respective movable shaft with, in order of, a seat ring of the upper frame, a third washer, a fourth washer, the axial hole of the upper lug, a fifth washer, at least a flexible part, and finally an end cap connected with the movable shaft.

8. The vertically adjustable supporting structure as claimed in claim 7, wherein between the seat ring of the upper frame and the third washer is disposed with a frictional disc, whose circumference extends outwardly to form a fastening tenon engagingly fastened and positioned onto a fastening slot formed on the circumference of the seat ring.

9. The vertically adjustable supporting structure as claimed in claim 7, wherein an arc-shape angle restricting groove is formed on an inner side of the seat ring of the upper frames to continuously accommodate an engaging tenon protrudingly formed on the circumference of the third washer.

10. The vertically adjustable supporting structure as claimed in claim 7, wherein between the upper lug and the fourth washer as well as between the fifth washer is disposed a frictional disc, respectively, whose circumference extends inwardly to form a fastening tenon engagingly fastened and positioned onto a fastening slot formed on the circumference of the axle hole of the upper lug.

11. The vertically adjustable supporting structure as claimed in claim 7, wherein a retaining device provided on the upper hinge, is formed by insertingly fitting, in an order of, a retaining ring and an engaging ring securingly disposed inside the seat ring between the movable shaft and the upper frames; the retaining ring is oppositely disposed with two protruding ring tenons on an inner surface thereof and the circumference of the engaging ring is formed to have two oppositely indented, arc-shape engaging slots, such that when the two upper frames rotate along with a top rack, the ring tenons of the retaining ring run across a stop edge of one engaging slot and engages onto the other engaging slot to render the upper frames parallel to the two lower frames.

12. The vertically adjustable supporting structure as claimed in claim 1, wherein, the flexible cord comprises two connection cords with a positioning block on both ends, respectively; two pin holes formed at both sides of a central wheel groove of the two axle wheels, respectively, are separated at a predetermined distance and correspond to each other, such that the respective pin holes of the lower and upper axle wheels are engagingly fitted by the positioning blocks on the both ends of the two connection cords for positioning.

13. The vertically adjustable supporting structure as claimed in claim 1, wherein a cord groove is formed at the center of the idle wheel to be interlacingly engaged with the flexible cord.

* * * * *